United States Patent
Chin et al.

(10) Patent No.: US 11,570,210 B2
(45) Date of Patent: Jan. 31, 2023

(54) ONLINE ADVERTISEMENT FRAUD DETECTION

(71) Applicant: T-Mobile USA, Inc., Bellevue, WA (US)

(72) Inventors: Michael Chin, Issaquah, WA (US); Aaron Drake, Sammamish, WA (US); Rami Al-Kabra, Bothell, WA (US); Adam Profitt, Lynnwood, WA (US); Tatiana Dashevskiy, Edmonds, WA (US); Jonathan Nolz, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 562 days.

(21) Appl. No.: 16/254,343

(22) Filed: Jan. 22, 2019

(65) Prior Publication Data

US 2019/0230122 A1 Jul. 25, 2019

Related U.S. Application Data

(60) Provisional application No. 62/620,429, filed on Jan. 22, 2018.

(51) Int. Cl.
*H04L 29/06* (2006.01)
*H04L 9/40* (2022.01)
(Continued)

(52) U.S. Cl.
CPC .......... *H04L 63/1483* (2013.01); *H04L 41/16* (2013.01); *H04L 41/5009* (2013.01); *H04L 43/028* (2013.01); *H04L 63/1416* (2013.01)

(58) Field of Classification Search
CPC .......... G06F 13/00; G06N 3/04; G06N 3/049; G06N 3/063; G06N 20/00; G06N 99/00; G06N 99/005; G06Q 30/00; G06Q 30/02; G06Q 30/0185; G06Q 30/0241; G06Q 30/0248; G06Q 30/0277; G06Q 30/0601; G06Q 40/00; G06Q 40/12; G06Q 50/00;
(Continued)

(56) References Cited

U.S. PATENT DOCUMENTS

| 10,108,968 B1* | 10/2018 | Tekle | G06Q 30/0248 |
| 2006/0136294 A1* | 6/2006 | Linden | G06Q 30/0257 |
| | | | 705/14.47 |

(Continued)

*Primary Examiner* — Longbit Chai
(74) *Attorney, Agent, or Firm* — Han Santos, PLLC (57) ABSTRACT

A fraud monitor in a managed network is provided. The fraud monitor uses the network's instrumentation data, configuration data, and account information to detect fraudulent activities in the network, such as fraudulent advertisement or other types of fraudulent data traffic, including fraudulent responses (e.g., fraudulent clicks) to advertisement. The fraud monitor receives configuration data and identification data for physical resources of the network. The fraud monitor receives instrumentation data of packet traffic in the network. The fraud monitor receives account information for users of the network. The fraud monitor analyzes the instrumentation data to detect a violation of a fraud detection policy that prevents malicious or fraudulent online advertisement activity based on the configuration data, identification data, or account information.

17 Claims, 6 Drawing Sheets

(51) Int. Cl.
*H04L 41/5009* (2022.01)
*H04L 41/16* (2022.01)
*H04L 43/028* (2022.01)

(58) Field of Classification Search
CPC ............... G06Q 50/01; H03H 21/0012; H03H 2222/04; H04L 12/24; H04L 29/06; H04L 41/16; H04L 41/5009; H04L 43/028; H04L 63/20; H04L 63/28; H04L 63/145; H04L 63/1408; H04L 63/1416; H04L 63/1441; H04L 63/1458; H04L 63/1466; H04L 63/1483; H04L 67/00; H04L 67/02; H04L 63/126
USPC ............................. 705/14.47; 706/12; 709/22
See application file for complete search history.

(56) References Cited

U.S. PATENT DOCUMENTS

| | | | |
|---|---|---|---|
| 2012/0173315 A1* | 7/2012 | Martini | G06Q 30/0241 705/14.4 |
| 2013/0080248 A1* | 3/2013 | Linden | G06Q 30/0248 705/14.47 |
| 2015/0178771 A1* | 6/2015 | Linden | G06Q 30/02 705/14.47 |
| 2016/0283975 A1* | 9/2016 | Kaul | G06Q 50/01 |
| 2016/0350800 A1* | 12/2016 | Qiu | G06Q 30/0277 |
| 2016/0350815 A1* | 12/2016 | Qiu | G06Q 30/0248 |
| 2018/0218283 A1* | 8/2018 | Jenson | G06Q 50/01 |
| 2019/0130440 A1* | 5/2019 | Qiu | G06Q 30/0248 |

\* cited by examiner

ONLINE ADVERTISEMENT FRAUD DETECTION

CROSS REFERENCE TO RELATED PATENT APPLICATION

This application claims priority to U.S. Provisional Patent Application No. 62/620,429, filed on Jan. 22, 2018, entitled "Fraud Detection," which is hereby incorporated by reference in its entirety.

BACKGROUND

Fraud conducted over the Web or Internet is a rampant problem hurting individual users as well as businesses. Legitimate websites are often populated with fraudulent advertisement that aims to solicit clicks for providers of malicious content. Fraudulent actors may also hire click farms to automate inputs to appear to "visit" websites in order to inflate click statistics and defraud website operators, advertisers, or online advertisement exchanges. These forms of fraud can be difficult for individual users and businesses to detect, since a visitor of a website or an online advertiser are unlikely to have all the information necessary to identify fraudulent content or fraudulent clicks.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Some embodiments of the disclosure provide a fraud monitor in a managed network that uses the network's instrumentation data, configuration data, and account information to detect fraudulent activities in the managed network, such as fraudulent advertisement or other types of fraudulent data traffic, including fraudulent responses (e.g., fraudulent clicks) to advertisement. The fraud monitor receives configuration data and identification data for physical resources of the managed network. The fraud monitor receives instrumentation data of packet traffic in the managed network. The fraud monitor receives account information for users of the managed network. The fraud monitor analyzes the instrumentation data to detect a violation of a fraud detection policy based on the configuration data, identification data, or account information. The fraud detection policy is implemented by the managed network to prevent malicious or fraudulent online advertisement activity, such as inflation of online advertisement click statistics or solicitation of user clicks on malicious online advertisements. Accordingly, the implementation of the fraud detection policy by the management network may protect website visitors, website operators, and online advertisement exchanges.

Figure 1:
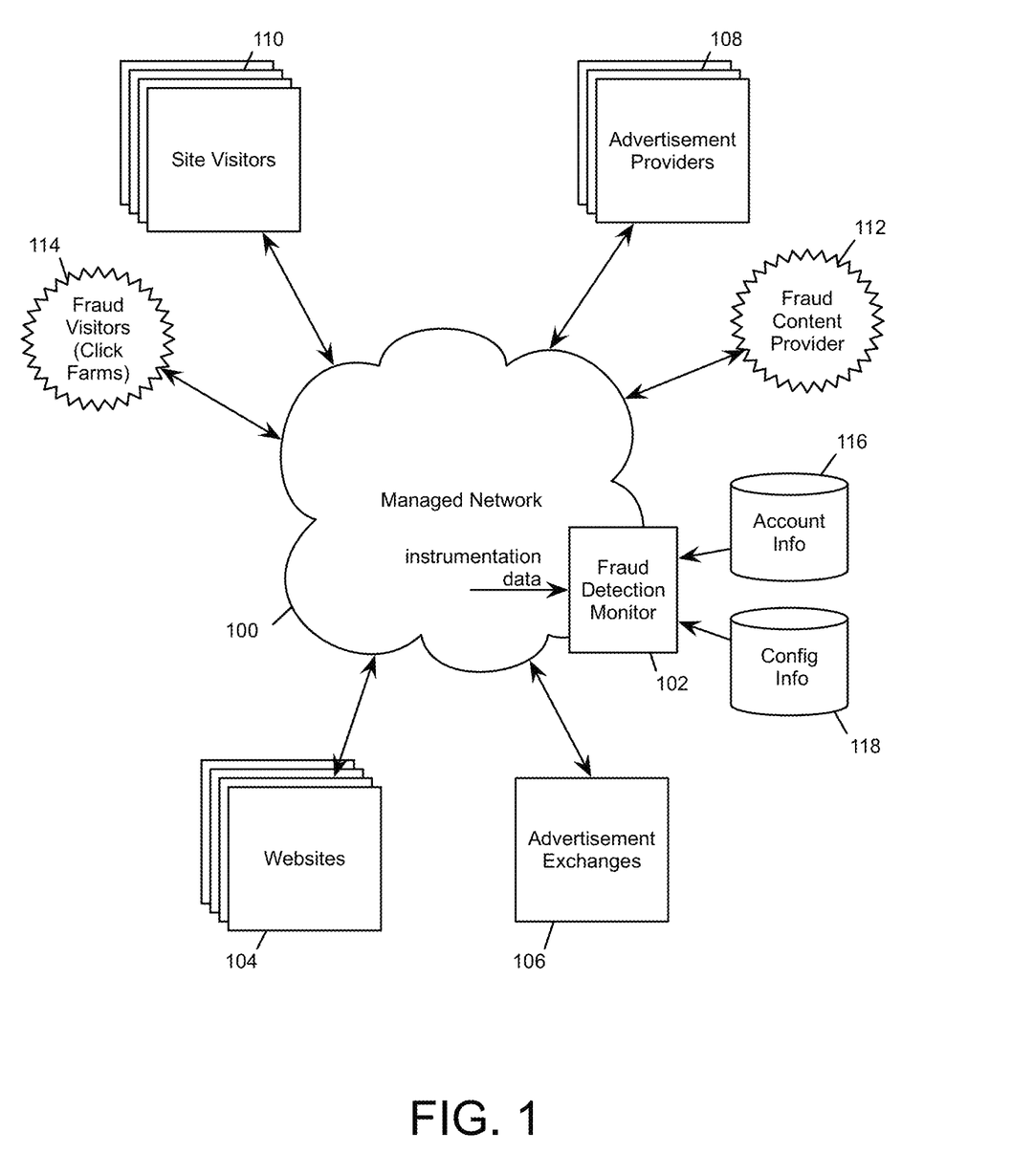
FIG. 1 conceptually illustrates a fraud monitor that detects fraudulent advertisement and fraudulent responses to advertisement in a network, consistent with an embodiment of the disclosure.

FIG. 1 conceptually illustrates a managed network 100 having a fraud monitor 102 that detects fraudulent advertisement and fraudulent responses to advertisement in the managed network 100, consistent with an embodiment of the disclosure. The figure illustrates data traffic over the managed network 100 at an application level.

The managed network 100 is a network that is managed by an Internet Service Provider (ISP). The ISP manages the operations of the network, configures and monitors its physical components (e.g., routers, switches), instruments data traffic, and gathers other types of telemetry data from physical components throughout the network. The managed network 100 may be part of a cellular network that is managed by the cellular service provider. In some embodiments, the managed network is a self-organized network (SON) implementing a collection of functions for automatic configuration, optimization, diagnosis, and healing of cellular networks.

As illustrated, the managed network 100 interlinks various application entities such as websites 104, advertisement exchanges 106, advertisement providers 108, and site visitors 110. The managed network 100 facilitates the exchange of data between these entities in forms of data packets. Some of the application entities sending data through the managed network 100 may be fraudulent actors, such as fraudulent content providers 112 or fraudulent site visitors 114. Some of the packets being exchanged by the application entities are monitored or intercepted by instrumentation or telemetry infrastructure of the managed network 100 as instrumentation data. The instrumentation data, which includes monitored data packets, are forwarded to the fraud monitor 102.

The websites 104 are content providers that may incorporate advertisements in their content in order to generate revenue. A website may be a news site, a social media site, a search engine, or any type of site that invites public visitors. The advertisement providers 108 provide advertisement that can be incorporated in the websites 104. The advertisement exchanges 106 provides a platform at which advertisers and website operators engage in buying and selling of website space and media advertising inventory. A website that receives higher volume of traffic from site visitors 110 or higher number of clicks on the advertisement may command higher fees or revenues from advertisement provider 108 through the advertisement exchange 106.

The fraudulent content providers 112 are malicious actors that generate fraudulent ads or other types of fraudulent content that can be delivered to websites. The fraudulent advertisement or content aims to induce clicks from unwitting visitors, which may cause the visitors to download malware or may redirect the visitor to a fraudulent web site.

The fraudulent site visitors 114 (e.g., click farms) generate fraudulent traffic to a website for defrauding the operator of the web site or for defrauding the advertisers who pay based on number of clicks. The fraudulent site visitors may also be hackers who generate the fraudulent traffic in order to steal information or to interfere with normal operations of the web site.

The fraud monitor 102 is an entity in the managed network 100 that uses the telemetry infrastructure of the managed network 100 to monitor data traffic in the network for fraudulent activities. In some embodiments, data forwarding elements of the managed network 100 may intercept packets traveling between any two endpoints of the network and forward the intercepted packets to the fraud monitor 102 as instrumentation data. The fraud monitor 102 may also use information available to the management function of the managed network 100 to detect fraudulent content and/or fraudulent data traffic. Information available to the management function of the network 100 may include account information 116 of individual subscribers of the managed network 100 and configuration information 118 of the managed network (e.g., configuration data and or identification data of the physical resources of the network 100). Some of the information is available to the management function of the managed network 100 as part of the network's self-configuration or self-optimization capabilities. At least some of the information available to the management of the network are not available to ordinary website operators, site visitors, advertisers, etc.

Figure 2:
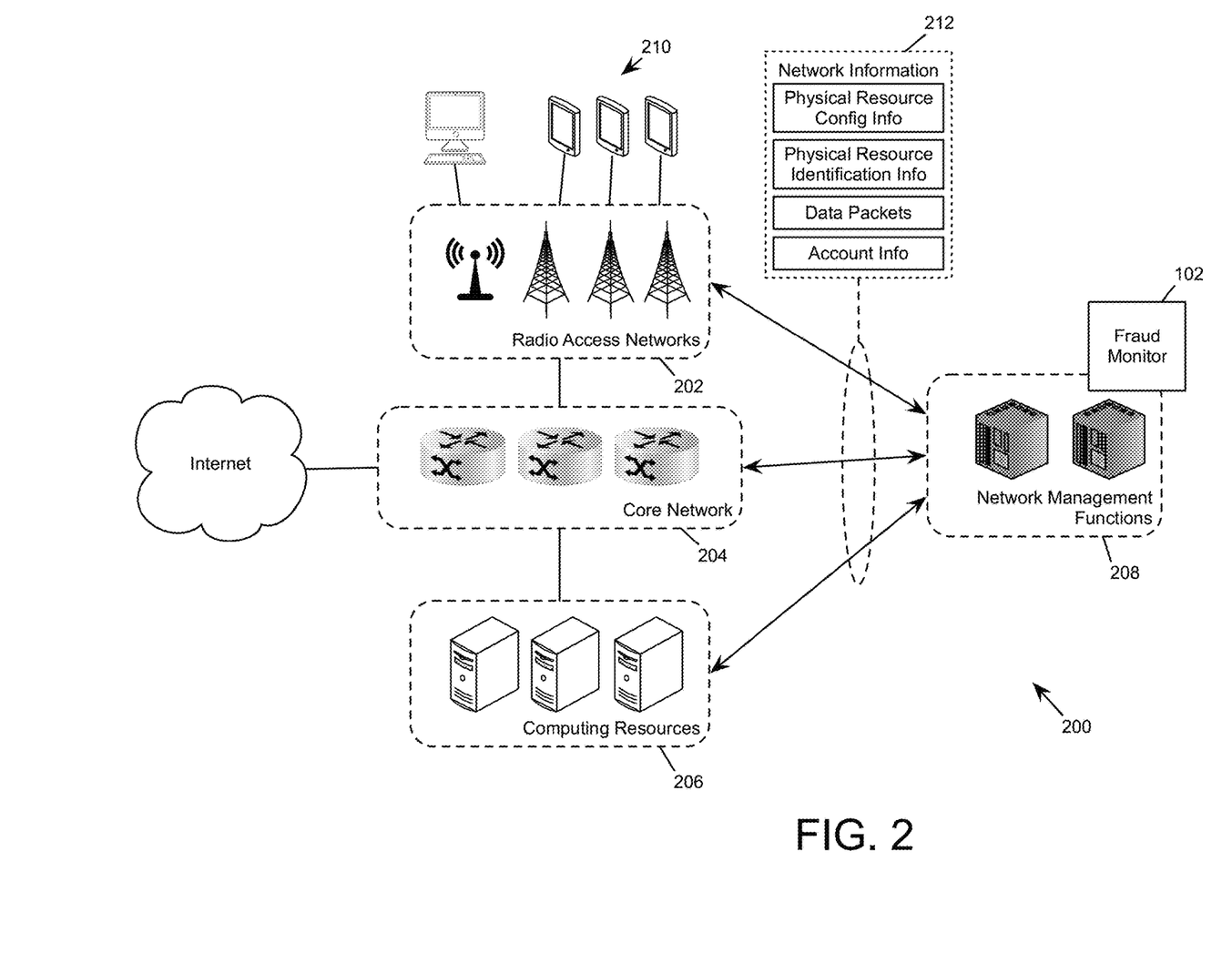
FIG. 2 conceptually illustrates a physical implementation of the network, consistent with an embodiment of the disclosure.

FIG. 2 conceptually illustrates a physical implementation of the managed network 100, consistent with an embodiment of the disclosure. The managed network 100 is a mobile or cellular network 200 having physical infrastructure capable of gathering and delivering instrumentation or telemetry data from physical components of the network 100. As illustrated, the physical components of the cellular network 200 include radio access networks 202, core networks 204, and computing resources 206. A set of network management functions 208 communicate with the radio access networks 202, the core networks 204, and the computing resources 206 to receive telemetry information and to deliver configuration data in the cellular network 200. In some embodiments, the network management 208 implements the fraud monitor 102.

The radio access network 202 is a network of base stations, macrocells, microcells, hotspots, and/or other types of wireless access facilities that allow user equipment 210 to access the cellular network 200. A user equipment such as a smart phone, tablet computer, laptop computer, desktop computer, or another type of computing device may establish an account with the operator of the cellular network 200 and access the network through a local base station, macrocell, microcell, or hotspot in the radio access network 202. A user equipment that is accessing the cellular network 200 may operate applications that act as the websites 104, the advertisement exchanges 106, the advertisement providers 108, or the site visitors 110 in the managed network 100.

The core network 204 is the backbone of the cellular network. The core network includes routers, switches, or other types of data forwarding elements for conducting data traffic (e.g., packet traffic) between various network endpoints. These network endpoints may include user equipment, base stations, or hotspots in the radio access networks 202, as well as any of the computing resources 206. The core network 204 also provides access to external networks (e.g., the Internet).

The computing resources 206 include servers, storage, processors, etc. that are available for access through the core network 204. The computing resource may host and operate client applications that act as the websites 104, the advertisement exchanges 106, the advertisement providers 108, or the site visitors 110. The computing resources 206 may also perform management functions for the cellular network 200, including the network management functions 208.

In some embodiments, the core network 204 and the computing resources 206 are provided by one or more data centers. In some of these embodiments, the forwarding elements (e.g., routers and switches) in the core network 204 are implemented by computing devices operating hypervisors, and the computing resources 206 are implemented by virtual machines in those computing devices.

The network management functions 208 handle management operations of the cellular network 200. Such operations may include self-optimization, self-configuration, and self-healing operations. The network management functions 208 perform the self-optimization by e.g., exchanging network information 212 with components of the core network 204 and of the computing resources 206. The exchanged data are useful for determining the traffic profile, topology, propagation, and interference of the network. The exchanged data may include headers of data packets that indicate source and destinations of the data traffic, content of advertisement to be displayed in a web site, as well as other types of traffic to the web sites such as clicks.

The network management functions 208 perform self-configuration by e.g., exchanging configuration data, identification data, and location data with components of the radio access network 202. These data may include configuration parameters and geographical locations for physical components of the cellular network 200 such as base stations.

The network management functions 208 receive various types of network information 212 from the radio access network 202, the core network 204, the computing resources 206, and other physical components of the managed network 100. The network information 212 includes configuration data of the managed network such as physical resource configuration information, identification information of physical resources. The network information 212 also includes instrumentation data of the managed network 100 from various physical components of the network. These instrumentation data include content and headers of data packets from various endpoints in the network. The network management function 208 also has access to information available to the operator of the cellular network 200, such as account information and service level agreements (SLAs). The account information sets the policy of how users or subscribers (such as site visitors 110) of the cellular network 200 may use the cellular network 200, as well as how client applications (such as websites 104) may operate in the managed network 100. The network information 212 collected by the network management functions 208 is also available to the fraud monitor 102.

A component of the computing resource 206 may implement the network management functions 208. The network management functions 208 may be implemented by one or more physical machines, or by one or more virtual machines operated by hypervisors in a data center. In a centralized network scheme, the network management functions 208 may be concentrated near higher-order network nodes or near the network's operations supporting system (OSS). In a distributed network scheme, the network management functions 208 may be distributed among network elements at the edge of the network, such as eNodeB (Evolved Node B) base stations in the radio access network 202. In some embodiments, the physical machines and/or the virtual machines that implement the network management function 208 also implement the fraud monitor 102.

Example Fraud Monitor

Figure 3:
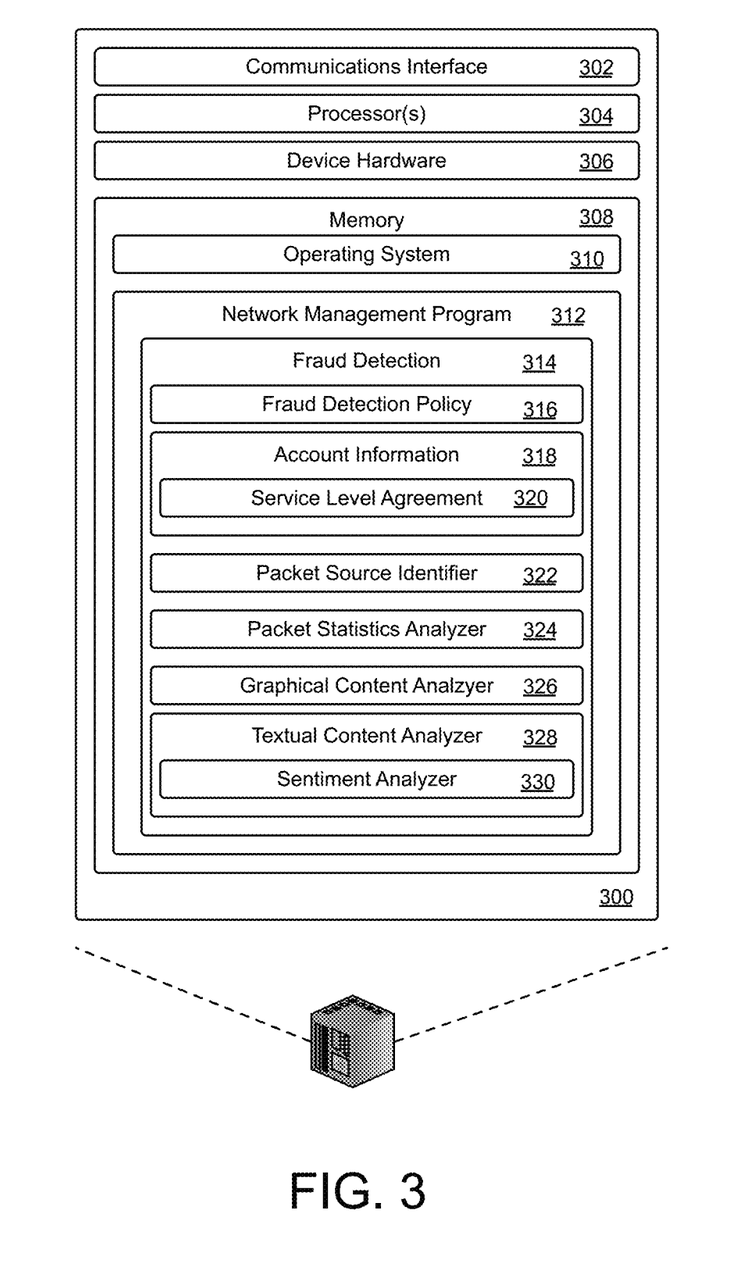
FIG. 3 is a block diagram showing various components of the fraud monitor, consistent with an embodiment of the disclosure.

FIG. 3 is a block diagram showing various components of the fraud monitor 102, consistent with an embodiment of the disclosure. The fraud monitor 102 is implemented at a computing device 300 that also implements the network management functions 208.

The computing device 300 may be a general purpose computer, such as a desktop computer, tablet computer, laptop computer, server, or other electronic devices that are capable of receiving input, processing the input, and generating output data. In some embodiments, the computing device 300 may be a virtual computing device in the form of virtual machines or software containers that are hosted in a cloud.

The computing device 300 may be equipped with a communications interface 302, one or more processors 304, device hardware 306, and memory 308. The communications interface 302 may include wireless and/or wired communication components that enable the computing device to transmit data to and to receive data from other devices, whether through a dedicated wired connection or via a communications network (e.g., the managed network 100). The device hardware 306 may include additional hardware that performs user interface, data display, data communication, data storage, and/or other server functions.

The memory 308 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 308 of the computing devices 300 may implement an operating system 310 and a network management program 312. The operating system 310 may include components that enable the computing devices 300 to receive and transmit data via various interfaces (e.g., user controls, communications interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The network management program 312 implements the network management functions 208. In some embodiments, the network management program 312 implements SON features so that the cellular network 200 performs self-optimization, self-configuration, and self-healing operations. The network management program 312 monitors the cellular network 200 by receiving SON information such as physical resource configuration information, identification information of physical resources, content and headers of data packets.

The fraud detection program 314 implements the fraud monitor 102. The fraud detection program 314 operates according to a set of fraud detection policy 316. The fraud detection program 314 analyzes various types of network information 212 received by the network management program 312 and identifies possible fraudulent content or data traffic in the received data to see if the fraud detection policy 316 is violated. Such network information may include network telemetry information provided by various network components including routers, switches, and bridges.

The fraud detection program 314 has access to account information 318, which may include service level agreement (SLA) 320. The information is available to the operator of the cellular network and made available to the network management program 312.

The fraud detection program 314 has a packet source identifier 322 for identifying the source of the data content. The network management program 312 has physical resource identification information and physical resource configuration information, which when coupled with the packet header information can be used to trace or determine the source of data traffic.

The fraud detection program 314 also includes a packet statistics analyzer 324. As the network management program 312 receives data related to traffic profile, topology, propagation, and interference from components of the managed network 100, the packet statistics analyzer 324 compiles statistics for different types of packets from different network endpoints. In some embodiments, the fraud detection program 314 applies machine learning based classifiers to the compiled packet statistics as well as to the content of the network information 212 to identify abnormal network traffic or fraudulent activities.

The fraud detection program 314 also includes a graphical content analyzer 326, which examines graphical content in the received network information to identify visual objects. The fraud detection program also includes a textual content analyzer 328, which examines the textual content in the received network information to identify subject or topics. The textual content analyzer 328 may also include a sentiment analyzer 330, which analyzes textual content to determine the attitude of a speaker, writer, or the overall contextual polarity or emotional reaction to a document, interaction, or event.

Figure 4A:
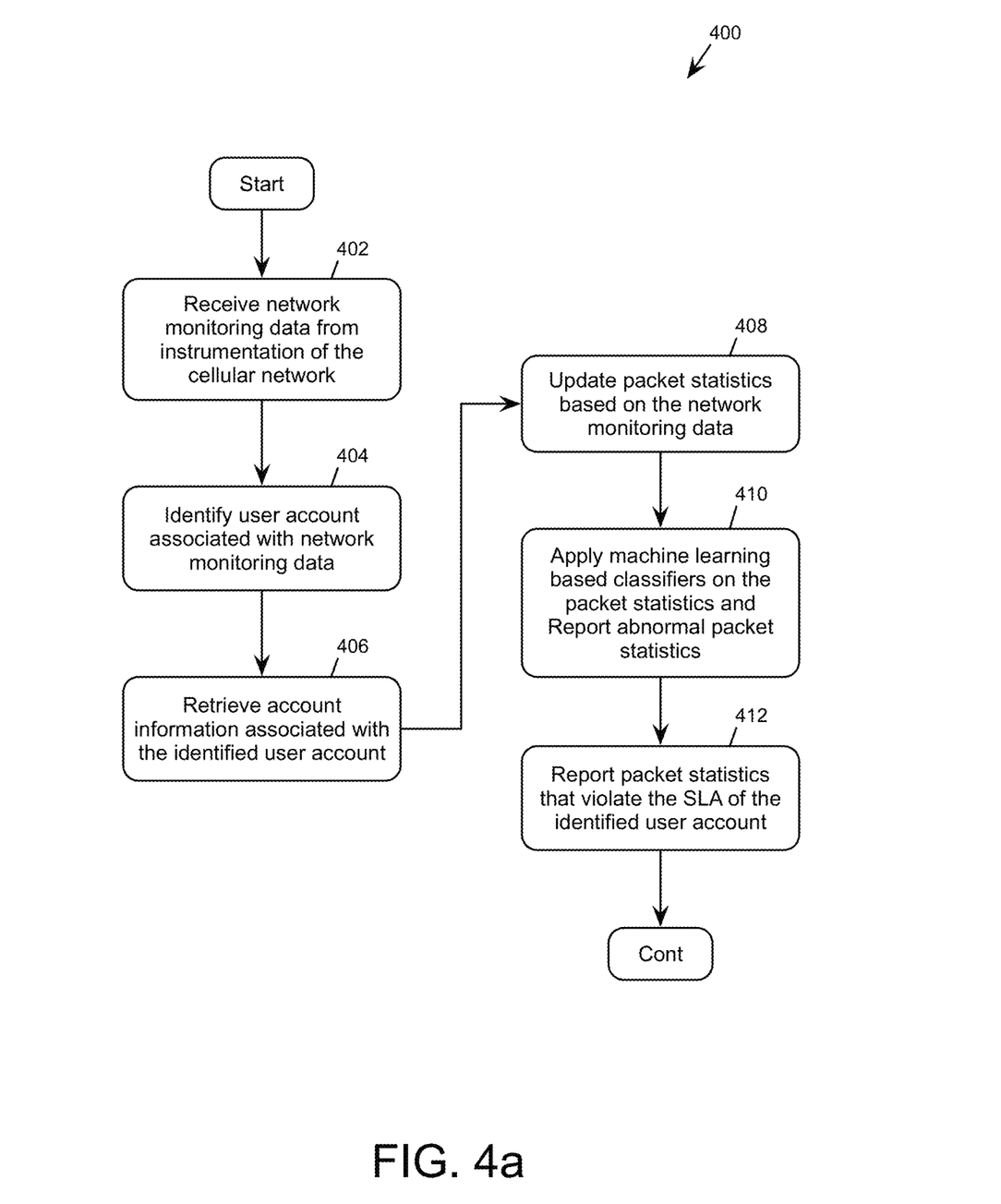
FIGS. 4a-4b conceptually illustrates a process for performing fraud detection in a network, consistent with an embodiment.
Figure 4B:
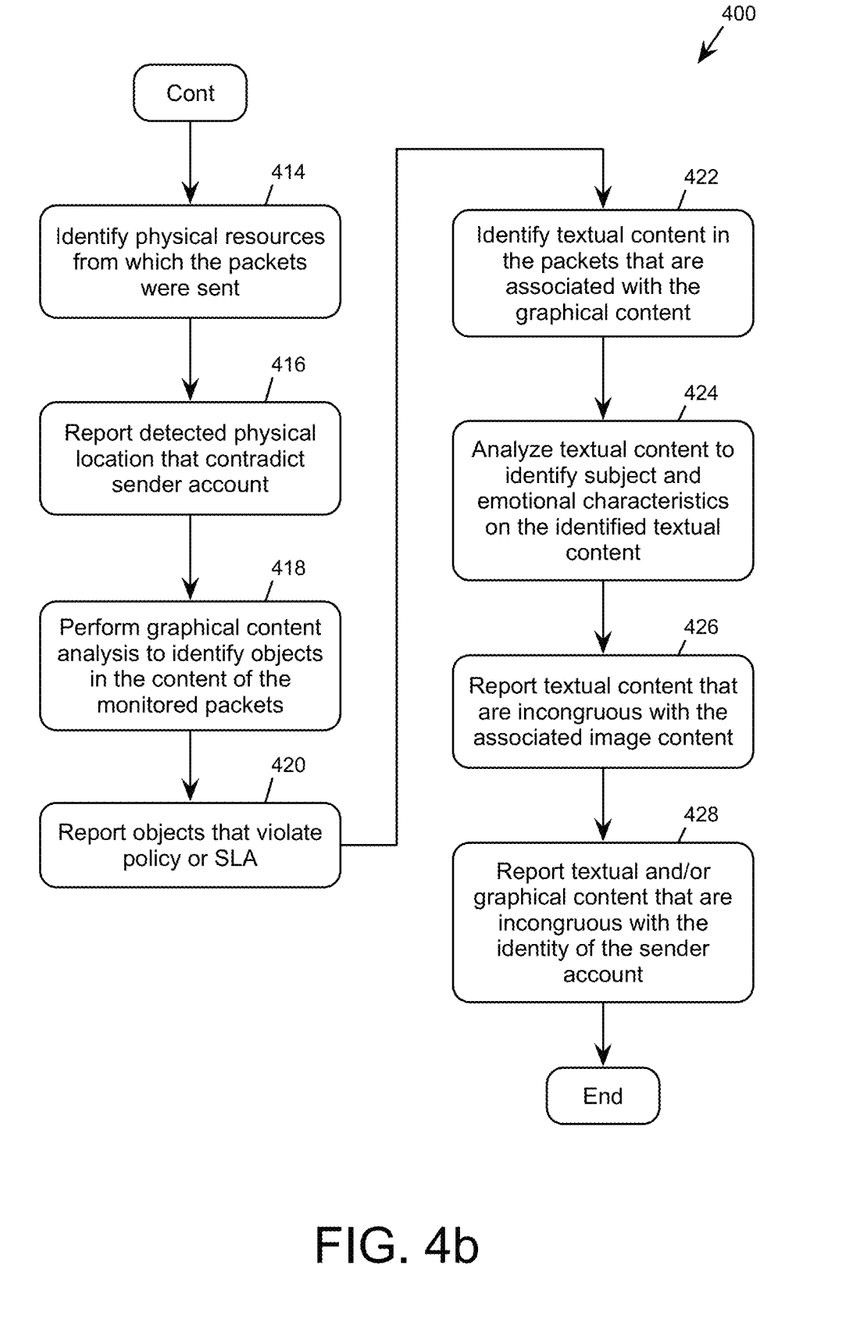

FIGS. 4a-4b conceptually illustrates a process 400 for performing fraud detection in a managed network, consistent with an embodiment of the disclosure. A computing device that implements the network management function 208 and/or the fraud monitor 102 for the cellular network 200 performs the process 400. The fraud monitor 102 analyzes the network information 212 to detect fraud. Specifically, the fraud monitor analyzes instrumentation data to detect a violation of the fraud detection policy in view of the network's configuration data, identification data, and account information.

The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process. For discussion purposes, the process 400 is described with reference to the computing device 300, which implements the network management functions 208 and the fraud monitor 102.

At block 402, the network management functions 208 receives network information 212 from instrumentation of the cellular network. The network information can include physical resource configuration information, physical resource identification information, and data packets (both payload content and header). At least some of the network information comes from instrumentation of the radio access networks 202, the core networks 204, and computing resources 206 of the cellular network 200 as part of the network's self-configuration and self-optimization features.

At block 404, the network management functions 208 identifies user or client account associated with the content of network information. For example, the fraud monitor 102 may examine the header of the instrumented data packets to identify the client application running in a computing resource that is sending out the packet.

At block 406, the network management functions 208 retrieves account information associated with the identified client account.

At block 408, the network management functions 208 or the fraud monitor 102 updates packet statistics based on the received network information. The network information may include packets instrumented from a specific network endpoint or from multiple network endpoints. The network management functions 208 may keep statistics of the mix of different types of packets, or statistics of packets at different times of the day or different days of the week, etc.

At block 410, the fraud monitor 102 (as part of the network management functions 208) applies machine learning based classifiers to the packet statistics as well as the content of the instrumented network information to detect fraudulent activities. Based on the output of the classifiers, the fraud monitor 102 may produce an alert when the content of the instrumented network information and/or packet statistics detect deviation from expected patterns in a way that violates the fraud detection policy. Examples of such detected deviation may include when the packet statistics show a sudden surge of a particular type of packets at unexpected times or from an unexpected source. Machine learning based fraud detection will be further described by reference to FIG. 5.

At block 412, the fraud monitor 102 reports packet statistics that violate the SLA of the identified user account. For example, the fraud monitor 102 may determine whether the advertisement providers 108 or the advertisement exchanges 106 are abiding by their SLA by examining the data traffic from these users. The SLA between the operator of the cellular network and a particular user may specify certain amount of data traffic or certain mix of packets. The fraud monitor examines the packet statistics against the SLA as a way to detect possible fraudulent data traffic. For example, unusual number of clicks coming from a particular network endpoint is used as an indication for identifying a click farm.

At block 414, the fraud monitor 102 identifies the physical resources from which the packets were sent. In some embodiments, the fraud monitor has access to the configuration data and the physical location information of the base stations or hotspots out in field. Based on this information, the fraud monitor may identify the physical sources of the data being monitored.

At block 416, the fraud monitor 102 detects and reports packet traffic whose detected actual source location contradicts the account information of the purported sender. For example, the fraud monitor 102 may generate an alert when the monitored data traffic is from a base station in a foreign country while the client application that generates the data traffic belongs to a domestic user account.

At block 418, the fraud monitor 102 performs graphical content analysis on the packet content in the network information. The network information may include graphical and textual content belonging to a website or an advertisement. The fraud monitor performs the graphical content analysis (e.g., at the graphical content analyzer 326) to identify objects or topics.

At block 420, the fraud monitor reports identified objects in the graphical content of the network information that violate the fraud detection policy or the SLA (e.g., illegal items, pornography, or other objectionable items, etc.)

At block 422, the fraud monitor identifies textual content in the monitoring data that are associated with the graphical content.

At block 424, the fraud monitor performs textual content analysis to identify the subject of the identified text. The fraud monitor may also perform sentiment analysis on the identified textual content (e.g., at the sentiment analyzer 330) to identify the emotional characteristics of the textual content.

At block 426, the fraud monitor 102 reports textual content whose identified subject matter or sentiment is incongruous with the textual content's associated graphical content. The incongruity between graphical content and textual content is used as an indication of fraudulent advertisement, or other forms of violation of the fraud detection policy.

At block 428, the fraud monitor 102 reports textual or graphical content that is incongruous with the account information of the purported sender. The account information may include identity of the sender (e.g., URL address). The fraud monitor would generate an alert if the subject matter or sentiment of the content is inconsistent with the known identity of the sender.

Figure 5:
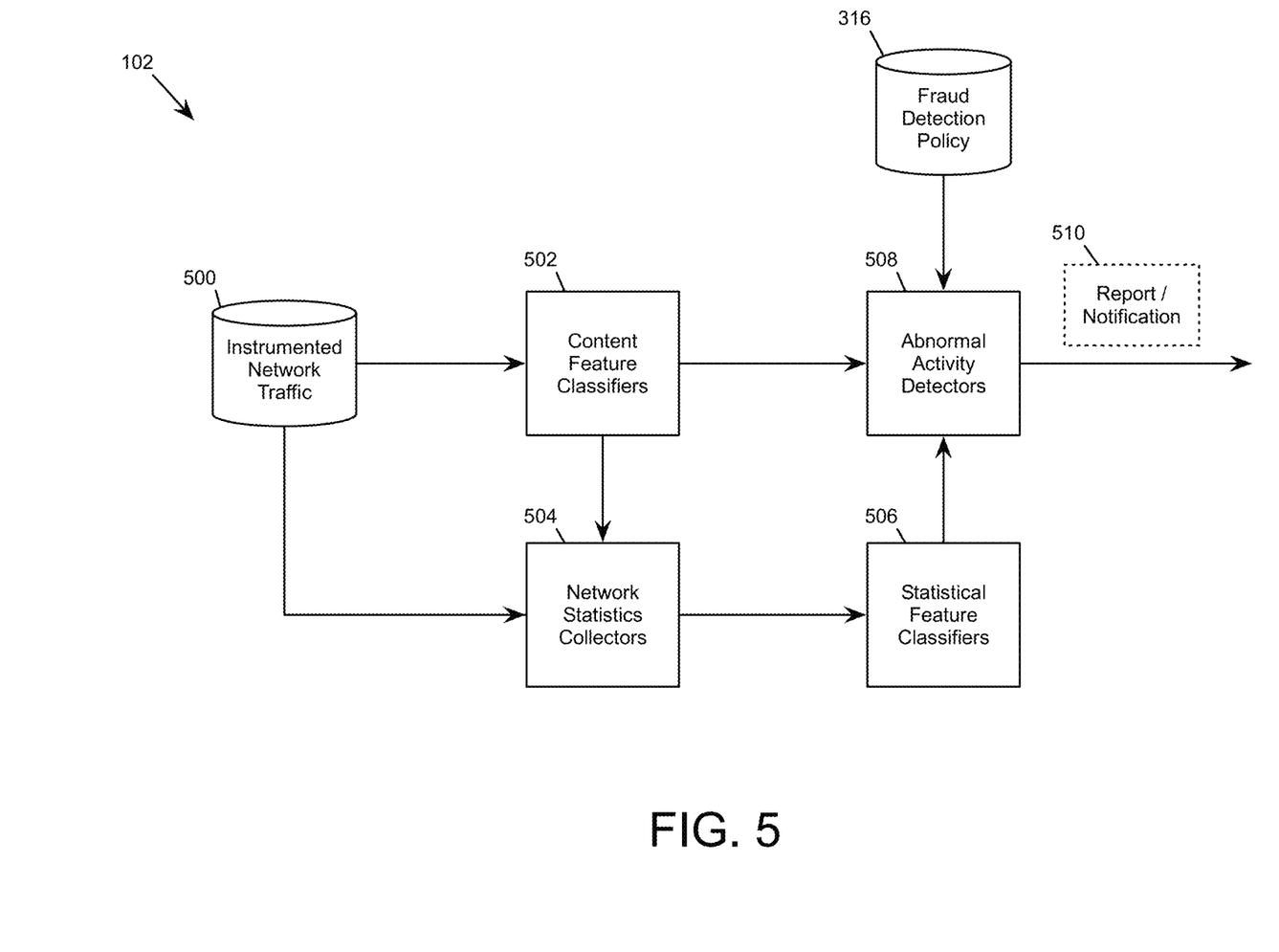
FIG. 5 illustrates applying machine learning based classifiers on network traffic to identify fraudulent activities, consistent with an exemplary embodiment.

FIG. 5 illustrates machine learning based fraud detection, consistent with an exemplary embodiment. Specifically, the fraud monitor 102 applies machine learning based classifiers to instrumented network information to identify fraudulent activities.

As illustrated, the fraud monitor 102 receives instrumented network traffic 500, which may be part of the network information 212 provided by the radio access network 202, the core network 204, the computing resources 206, and/or other physical components of the managed network 100. The network traffic 500 may include both encrypted traffic and unencrypted traffic. The monitored network traffic is processed by content feature classifiers 502, network statistics collectors 504, statistical feature classifiers 506, and abnormal activity detectors 508.

The content feature classifiers 502 classify the instrumented network traffic 500 according to features that are detectable based on the content of the network traffic. For example, the content feature classifiers 502 may include an advertisement traffic classifier that is trained by machine learning to identify advertisement related traffic. A training set for such a classifier may be a set of unencrypted network traffic that is labeled based on a known list of advertisers (e.g., by having instrumented network traffic pre-processed by an advertisement blocking program such as AdBlock™). The content feature classifiers 502 may include other types of classifiers, such as classifiers for identifying the origin of the packets (e.g., from which country), types of content (e.g., graphic or text), etc. In some embodiments, the content feature classifiers 502 continue machine learning process during normal operations of the fraud monitor 102.

The network statistics collectors 504 collect various statistics from the instrumented network traffic 500. These statistics may include packet counts and/or average packet sizes for a particular time period, for a particular IP address, for a particular account, for a particular physical resource of the cellular network 200, etc. These statistics may also include statistics based on features detected by the content feature classifier 502, such as number of packets that are identified as being advertisement, the number of packets that are identified as being from a particular origin, the number of packets of a particular type, etc.

The statistical feature classifiers 506 identify features in the network traffic based on the statics collected by the network statistics collectors 504. The statistical feature classifiers 506 may include unsupervised classifiers that are trained to detect abnormal amount traffic of a particular type, of a particular account, of a particular origin, of a particular time period, etc.

The abnormal activity detectors 508 generate reports or notifications 510 of abnormal or suspected fraudulent activities. The report is generated based on features of the network traffic that are detected by the content feature classifiers 502 and the statistical feature classifiers 506. In some embodiments, the abnormal activity detectors 508 are configured according to the fraud detection policy 316 to specify the conditions for reporting abnormal activities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a computing device of a fraud monitor storing computer-executable instructions that upon execution cause one or more hardware processors to perform acts comprising:
receiving configuration data, identification data, and geographical locations for physical resources of a managed network, wherein the configuration data includes physical resource configuration information that relates to one or more computing devices in the managed network, wherein the physical resource configuration information includes at least geographic locations for the physical resources and the identification data includes at least account information;
receiving instrumentation data of packet traffic in the managed network;
identifying an account information of the managed network based on the received instrumentation data of packet traffic;
receiving the account information of the managed network, wherein the account information includes policies in a service level agreement between an operator of a radio access network and a user account of the radio access network, wherein the policies in the service level agreement specifies a certain amount of packet traffic and certain mix of data packets from a particular network endpoint of the radio access network, wherein the certain amount of packet traffic includes corresponding packet traffic that indicates an unusual number of clicks originated from the particular network endpoint, and wherein the certain mix of data packets include corresponding data packets that comprise at least one of textual or image content that are incongruous with an identity of the user account;
detecting actual physical source location based on the received instrumentation data of packet traffic; and
analyzing the received instrumentation data to detect a violation of a fraud detection policy that prevents malicious or fraudulent online advertisement activity by at least determining whether the received instrumentation data of packet traffic whose detected actual physical source location contradicts the particular network endpoint of the radio access network specified in the service level agreement of the received account information of the identified account information.

2. The one or more non-transitory computer-readable media of claim 1, wherein the instrumentation data comprises graphical content and the textual content associated with the graphical content, wherein analyzing the instrumentation data comprises detecting textual content that is incongruous with the associated graphical content to determine whether the detected textual content contradicts the certain mix of data packets specified in the service level agreement.

3. The one or more non-transitory computer-readable media of claim 1, wherein the instrumentation data comprises graphical content, wherein analyzing the instrumentation data comprises identifying the object in the image that violates the fraud detection policy to determine whether the identified object in the image contradicts the certain mix of data packets specified in the service level agreement.

4. The one or more non-transitory computer-readable media of claim 1, wherein the instrumentation data comprises textual content, wherein analyzing the instrumentation data comprises performing sentiment analysis of the textual content to determine whether the performed sentiment analysis contradicts the certain mix of data packets specified in the service level agreement.

5. The one or more non-transitory computer-readable media of claim 1, wherein analyzing the instrumentation data comprises applying machine learning based classifiers to packet statistics and content of the instrumentation data to identify abnormal network traffic to determine whether the identified abnormal network traffic contradicts the certain amount of packet traffic specified in the service level agreement.

6. The one or more non-transitory computer-readable media of claim 1, wherein analyzing the instrumentation data comprises detecting content in the instrumentation data that is incongruous with an identity of a sender of the content.

7. The one or more non-transitory computer-readable media of claim 1, wherein analyzing the instrumentation data comprises using the configuration data and the identification data of the physical resources in the managed network to identify a physical location associated with content of the instrumentation data and to detect an identity of a sender of the content that is incongruous with the determined physical location.

8. A computing device of a fraud monitor comprising:
one or more hardware processors; and
a computer-readable medium storing a plurality of computer-executable components that are executable by the one or more processors to perform a plurality of actions, the plurality of actions comprising:

receiving configuration data, identification data, and geographical locations for physical resources of a managed network, wherein the configuration data includes physical resource configuration information that relates to one or more computing devices in the managed network, wherein the physical resource configuration information includes at least geographic locations for the physical resources and the identification data includes at least account information;

receiving instrumentation data of packet traffic in the managed network;

identifying an account information of the managed network based on the received instrumentation data of packet traffic;

receiving the account information of the managed network, wherein the account information includes policies in a service level agreement between an operator of a radio access network and a user account of the radio access network, wherein the policies in the service level agreement specifies a certain amount of packet traffic and certain mix of data packets from a particular network endpoint of the radio access network, and wherein the certain amount of packet traffic includes corresponding packet traffic that indicates an unusual number of clicks originated from the particular network endpoint, and wherein the certain mix of data packets includes corresponding data packets that comprise at least one of textual or image content that are incongruous with an identity of the user account;

detecting actual physical source location based on the received instrumentation data of packet traffic; and analyzing the received instrumentation data for violation of a fraud detection policy that prevents malicious or fraudulent online advertisement activity by at least determining whether the received instrumentation data of packet traffic whose detected actual physical source location contradicts the particular network endpoint of the radio access network specified in the service level agreement of the received account information of the identified account information.

9. The computing device of claim 8, wherein the instrumentation data comprises graphical content and the textual content associated with the graphical content, wherein analyzing the instrumentation data comprises detecting textual content that is incongruous with the associated graphical content to determine whether the detected textual content contradicts the certain mix of data packets specified in the service level agreement.

10. The computing device of claim 8, wherein the instrumentation data comprises graphical content, wherein analyzing the instrumentation data comprises identifying the object in the image that violates the fraud detection policy to determine whether the identified object in the image contradicts the certain mix of data packets specified in the service level agreement.

11. The computing device of claim 8, wherein the instrumentation data comprises textual content, wherein analyzing the instrumentation data comprises performing sentiment analysis of the textual content to determine whether the performed sentiment analysis contradicts the certain mix of data packets specified in the service level agreement.

12. The computing device of claim 8, wherein analyzing the instrumentation data comprises applying machine learning based classifiers to packet statistics and content of the instrumentation data to identify abnormal network traffic to determine whether the identified abnormal network traffic contradicts the certain amount of packet traffic specified in the service level agreement.

13. The computing device of claim 8, wherein analyzing the instrumentation data comprises detecting content in the instrumentation data that is incongruous with an identity of a sender of the content.

14. The computing device of claim 8, wherein analyzing the instrumentation data comprises using the configuration data and the identification data of the physical resources in the managed network to identify a physical location associated with content of the instrumentation data and to detect an identity of a sender of the content that is incongruous with the determined physical location.

15. A computer-implemented method of a fraud monitor, comprising:

receiving configuration data, identification data, and geographical locations for physical resources of a managed network, wherein the configuration data includes physical resource configuration information that relates to one or more computing devices in the managed network, wherein the physical resource configuration information includes at least geographic locations for the physical resources and the identification data includes at least account information;

receiving instrumentation data of packet traffic in the managed network;

receiving the account information of the managed network, wherein the account information includes policies in a service level agreement between an operator of a radio access network and a user account of the radio access network, wherein the policies in the service level agreement specifies a certain amount of packet traffic and certain mix of data packets from a particular network endpoint of the radio access network, wherein the certain amount of packet traffic includes corresponding packet traffic that indicates an unusual number of clicks originated from the particular network endpoint, and wherein the certain mix of data packet includes correspond data packets that comprise at least one of textual or image content that are incongruous with an identity of the user account;

detecting actual physical source location based on the received instrumentation data of packet traffic; and analyzing the received instrumentation data to detect a violation of a fraud detection policy that prevents malicious or fraudulent online advertisement activity by at least determining whether the received instrumentation data of packet traffic whose detected actual physical source location contradicts the particular network endpoint of the radio access network specified in the service level agreement of the received account information of the identified account information.

16. The computer-implemented method of claim 15, wherein the instrumentation data comprises graphical content and the textual content associated with the graphical content, wherein analyzing the instrumentation data comprises detecting textual content that is incongruous with the associated graphical content to determine whether the detected textual content contradicts the certain mix of data packets specified in the service level agreement.

17. The computer-implemented method of claim 15, wherein analyzing the instrumentation data comprises using the configuration data and the identification data of the physical resources in the managed network to identify a physical location associated with content of the instrumentation data and to detect an identity of a sender of the content that is incongruous with the determined physical location.

\* \* \* \* \*